United States Patent [19]

Fischer et al.

[11] Patent Number: 5,194,561
[45] Date of Patent: Mar. 16, 1993

[54] PROCESS FOR THE PREPARATION OF AN AROMATIC POLYETHER IN THE PRESENCE OF FINELY DIVIDED CONDENSATION AUXILIARIES

[75] Inventors: Hartmut Fischer, Hofheim am Taunus; Arnold Schneller, Mainz, both of Fed. Rep. of Germany

[73] Assignee: Hoechst Aktiengesellschaft, Frankfurt am Main, Fed. Rep. of Germany

[21] Appl. No.: 563,498

[22] Filed: Aug. 7, 1990

[30] Foreign Application Priority Data

Aug. 9, 1989 [DE] Fed. Rep. of Germany ....... 3926262

[51] Int. Cl.$^5$ .................. C08G 8/02; C08G 14/00; C08G 65/38; C08G 75/00
[52] U.S. Cl. .................................... 528/125; 528/126; 528/128; 528/174; 528/175; 528/219; 525/534; 525/535
[58] Field of Search ............... 528/125, 126, 128, 219, 528/174, 175; 525/534, 535

[56] References Cited

U.S. PATENT DOCUMENTS 3,065,205  11/1962  Bonner ................................. 528/125

FOREIGN PATENT DOCUMENTS 847963   7/1970  Canada.
0001879  5/1979  European Pat. Off..
0195448  9/1986  European Pat. Off..
1545106  5/1979  Fed. Rep. of Germany.
2803873  4/1982  Fed. Rep. of Germany.

OTHER PUBLICATIONS

"Comprehensive Polymer Science", vol. 5, Pergamon Press 1989, p. 492.

Primary Examiner—John Kight, III
Assistant Examiner—P. Hampton-Hightower
Attorney, Agent, or Firm—Curtis, Morris & Safford

[57] ABSTRACT

Process for the preparation of an aromatic polyether in the presence of finely divided condensation auxiliaries.

The process for the preparation of an aromatic polyether by condensation of the reactants in the presence of carbonates of metals of Group I of the Periodic Table, as condensation auxiliaries, employs the metal carbonates sodium carbonate or sodium bicarbonate or mixtures thereof in the form of very finely ground salts.

The fine particle size distribution of the carbonate allows a significant shortening of the reaction times and permits polyethers having a defined degree of condensation to be reproducibly prepared.

17 Claims, No Drawings

PROCESS FOR THE PREPARATION OF AN AROMATIC POLYETHER IN THE PRESENCE OF FINELY DIVIDED CONDENSATION AUXILIARIES

DESCRIPTION

The invention relates to a process for the preparation of an aromatic polyether which contains the groups —$SO_2$— and/or —CO—. These polyethers are designated below as aromatic polyether ketones or as aromatic polyether sulfones according to whether the keto or sulfonyl groups predominate.

Aromatic polyethers are known as valuable categories of polymer having favorable properties. In particular, they have high heat resistance and very good chemical resistance.

Aromatic polyethers can be prepared by an electrophilic polycondensation reaction (Friedel-Crafts reaction) of polynuclear aromatic acid halides (in which at least one aryl radical must have nucleophilic substituents), for example of a phenoxyaryl carbonyl chloride, or by condensation of a dicarboxylic acid halide with an electronrich aromatic, for example a diaryl ether (US-A-3,065,205).

Another suitable synthesis is the nucleophilic polycondensation of halophenols, the halogen group being activated by electronegative substituents in ortho- or para-positions, or the nucleophilic polycondensation of dihydric, mononuclear or polynuclear phenols with activated dihaloaromatics. In the nucleophilic polycondensation, the actual agent is the phenolate ion formed from the phenol by the action of alkalis (DE-C-1,545,106 and CA-A- 847,963).

The phenolate ions are formed either by reacting the phenol with, for example, alkali metal hydroxides and subsequently eliminating the water of reaction by azeotropic distillation (DE-C-1,545,106) or else by adding alkali metal carbonates or alkali metal bicarbonates to the condensation mixture (CA-A-847,963). The alkali metal carbonates chiefly used are potassium carbonate or mixtures of potassium carbonate and sodium carbonate.

In the case of potassium carbonate or potassium bicarbonate, the phenolate formation proceeds very rapidly and consequently high molecular weight polyethers can be obtained. A disadvantage of this process is the formation of gel particles which make the polyethers unsuitable for use in the preparation of films. Furthermore, on preparing the polyether in a reactor, black particles are formed (DE-P 28 03 873).

It has been reported, for example, that the sole use of sodium carbonate or sodium bicarbonate gives only brittle polycondensates having a low molecular weight and poor color (EP-B-1879). The disadvantageous action of sodium carbonate as a base in phenolate formation in the synthesis of polyether ketones is given particular emphasis in this patent specification and the sole use of sodium carbonate or sodium bicarbonate is considered infeasible.

In keeping with this, another publication proposes the use of a mixture of alkali metal carbonates as the base (DE-A-2,803,873). The combination of (a large quantity of) sodium carbonate with (a little) potassium carbonate considerably reduces the reaction time and increases the achievable final degree of condensation significantly in comparison with the sole use of sodium carbonate. However, the problems causally associated with potassium carbonate such as gel formation and black particle formation are only reduced and not eliminated. In agreement with the above-cited EP-B-1879, it is also reported in DE-A-2,803,873 that polycondensates which have been prepared using sodium carbonate alone are inferior in molecular weight, toughness and color to polycondensates which have been prepared using potassium carbonate or mixtures of alkali metal carbonates. On using sodium carbonate as the base, even after a reaction time of 21 hours the reduced viscosity of the polycondensate which has been formed is significantly less than on using potassium carbonate after a reaction time of one hour.

Another publication proposes the use of mixtures of sodium carbonate and/or bicarbonate with potassium fluoride or higher metal halides as condensation auxiliaries (EP-A-0,195,448). However the description and examples mention or employ, without exception, sodium carbonate and/or potassium carbonate with metal halides. Neither the description nor the examples discuss any effect of the bicarbonates. On additionally using potassium fluoride with carbonates for polycondensation, to achieve a higher molecular weight in a shorter reaction time, it is necessary to take precautions with regard to the material of the reaction vessels owing to the pronounced corrosiveness of potassium fluoride.

The object of the invention is therefore to provide a process which allows the preparation, in short reaction times, of aromatic polyethers having specified molecular weights which are controllable by means of the reaction conditions, this process giving products which are substantially free of gel constituents and are not discolored.

The present invention accordingly provides a process for the preparation of an aromatic polyether by condensation of the reactants in the presence of carbonates of metals from Group I of the Periodic Table as condensation auxiliaries, optionally in the presence of a solvent, in which process the metal carbonates are used in the form of very finely ground salts, preferably sodium carbonate or sodium bicarbonate or mixtures thereof. The condensation auxiliary (base for phenolate formation) used is in particular only sodium carbonate, sodium bicarbonate or any desired mixtures of these substances, which have been brought by means of a preliminary grinding step to a particle size distribution in which 90 percent by weight of particles have a particle size of below 50 $\mu$m ($D_{90}$ value $<50$ $\mu$m).

The preparation of metal carbonates such as sodium carbonate and sodium bicarbonate having a particle size $D_{90}$ value of below 50 $\mu$m can be carried out using commercially available mills. For instance, conventional jet mills can be used such as helical jet mills, oval tube jet mills, counterjet mills, fluidized bed jet mills, and ball and plate jet mills. A survey of mills and grinding processes is given in K. Höffl, Zerkleinerungs-und Klassiermaschinen, (Springer Verlag, Berlin, 1986).

Various particle size $D_{90}$ values can be adopted, depending on the requirements of the application. The particle sizes used depend on the components which are to be used for the reaction. While, owing to the higher reactivity of the monomers, polyether sulfone synthesis can proceed satisfactorily using sodium carbonate or sodium bicarbonate having a $D_{90}$ value of about 50 $\mu$m, polyether ketone synthesis requires a more finely ground material.

For polyether ketone synthesis, preference is given to the use of metal carbonates or metal bicarbonates having a $D_{90}$ value of below 30 μm, in particular below 20 μm.

The total amount of carbonate is generally adjusted so that at least one mole of metal atoms are present per mole of hydroxyl groups. In some cases, it can be advantageous to use an excess of carbonate of up to 20%, so that the total amount of carbonate is in most cases 1 to 1.2 moles of metal atoms per mole of hydroxyl groups, according to the invention.

The greatly increased reactivity by virtue of the fine distribution of the carbonate allows not only a significant shortening of the reaction times in comparison with the prior art, but moreover allows a selective control of the end point of the polycondensation. Accordingly, the procedure followed is first to charge the dihalo compound as such or in solution and to add, at the reaction temperature, the dihydroxy component together with the finely ground carbonate in amounts according to the progress of the reaction. This avoids an excess of free dihydroxy compound in the reaction mixture, thus preventing degradation reactions which are considered to be the cause of gel particles and discoloration. If the dihalo compound is sufficiently stable in the presence of the finely divided carbonate at the reaction temperature which has been selected for the condensation, the process can be varied so that the reaction vessel is first charged with the dihalo compound together with the carbonate or a portion thereof and only the dihydroxy compound, alone or mixed with the remainder of the carbonate, is metered into the reacting mixture. All of the variants of this process allow the polycondensation to be conducted to a defined end point, which is precisely defined by the viscosity of the system and this allows polyethers having a defined degree of condensation to be reproducibly prepared.

"Aromatic polyethers" are understood to mean polymers which, besides the oxygen atom of the ether linkage, may also contain other atoms and/or groups in the main chain such as sulfur atoms and/or carbonyl, imino, sulfonyl, and sulfoxide groups, alkylidene groups having 1 to 3 carbon atoms in the radical, and also halogenated alkylidene radicals.

The polyethers obtained by the process according to the invention are high molecular weight compounds whose inherent viscosities (measured in a solution of 0.5 g of the polymer in 100 ml of solvent) are generally from 50 to 500, preferably from 75 to 300 ml/g.

The polyethers are prepared according to the invention under generally customary conditions and with the reaction of the known reactants (monomers), i.e., for example, of dihydric phenols with activated aromatic dihalo compounds or of polynuclear activated halophenols in which the halogen is located on a different aromatic nucleus from the hydroxyl group, or of halophenols of this type with mutually equivalent amounts of dihydric phenols and activated aromatic dihalo compounds.

In the first case mentioned, i.e. in the reaction of dihydric phenols with activated aromatic dihalo compounds, the molar ratio of the two reactants is normally 0.9 to 1.1:1.0. The compounds are preferably used in the molar ratio of 1:1 or with a slight excess of the dihalo compound.

Suitable dihydric phenols are compounds of the formula (1)

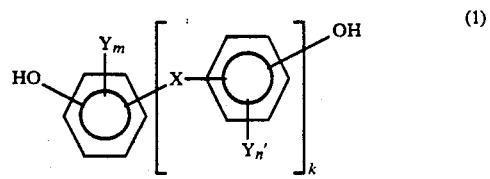

for example mononuclear diphenols such as hydroquinone, resorcinol or homologs thereof such as methylhydroquinone and phenylhydroquinone.

Other suitable diphenols are those in which two phenol radicals are linked via a direct bond or via atoms or groups such as oxygen, sulfur, carbonyl, sulfonyl, sulfoxide, alkylidene groups having 1–3 carbon atoms in the radical, and also halogenated alkylidene radicals, phenylene, oxyphenyleneoxy and carbonylphenylenecarbonyl.

These polynuclear diphenols can likewise be described by the formula (1). In this formula, Y and Y' represent alkyl groups or alkoxy groups each having 1 to 8, preferably 1 to 4, carbon atoms, aryl or aryloxy groups (aryl preferably phenyl or naphthyl) or halogen atoms, m and n, independently of one another, are zero, one, two, three or four (in the case where Ar = phenylene) or greater (in the case of other aryl radicals such as naphthylene), preferably zero or 1, and k is zero, 1 or 2. X is an alkylidene or cycloalkylidene group having 1–3 carbon atoms in the alkylidene group, and also perfluorinated derivatives thereof, or represents a direct bond, —O—, —S—, —SO—, —SO$_2$—, —CO—, —C$_6$H$_4$—, —O—C$_6$H$_4$—O— or —CO—C$_6$H$_4$—CO—. Particular preference is given to compounds of the formula (1) in which X is a direct bond, —O—, —S—, —SO$_2$—, —CO—, —CH$_2$—, —C(CH$_3$)$_2$—, or —C(CF$_3$)$_2$—, m and n are zero and k is zero or 1.

Examples of diphenols of this type are:

2,2-Bis(4'-hydroxyphenyl)propane, 2,2-bis(4'-hydroxy-3',5'-dimethylphenyl)propane, bis (4'-hydroxyphenyl)methane, bis(4'-hydroxyphenyl)cyclohexane, 1,1-bis(4'-hydroxyphenyl)ethane, 2,2-bis(4'-hydroxyphenyl)-1,1,1,3,3,3-hexafluoropropane, 2,2'-dihydroxydiphenyl, 3,3'-dihydroxydiphenyl, 4,4'-dihydroxydiphenyl, 3,4'-dihydroxydiphenyl, 4,4'-dihydroxydiphenyl ether, 4,4'-dihydroxydiphenyl sulfide, 4,4'-dihydroxydiphenyl sulfoxide, 4,4'-dihydroxydiphenyl sulfone, 4,4'-dihydroxybenzophenone, 1,4-bis(4'-hydroxyphenoxy)benzene, 1,3-bis(4'-hydroxy-phenoxy)benzene, 1,4-bis(4'-hydroxybenzoyl)benzene, 1,3-bis(4'-hydroxybenzenesulfonyl)-benzene, 1,3-bis(4,-hydroxybenzenesulfonyl)benzene.

The activated aromatic dihalo compounds are mononuclear or polynuclear compounds whose halogen atoms are activated by electronegative substituents in the o- or p-position relative to the said halogen atoms. In the case of polynuclear compounds, the halogen atoms are preferably on different benzene rings; the electronegative substituents in this case can form the linkage between the benzene rings. Suitable dihalo compounds are described by the formulae

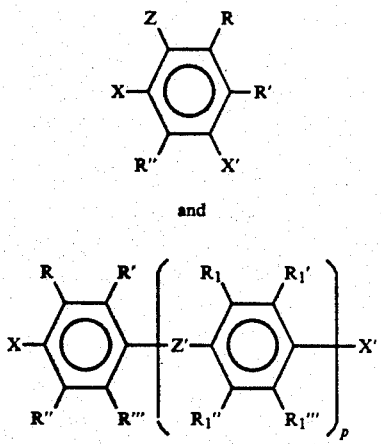

(2)

(3)

in which R, R', R", R''', $R_1$, $R'_1$, $R''_1$, and $R'''_1$ are identical or different and can be selected from the group comprising hydrogen, alkyl or alkoxy (each of which advantageously has 1 to 8, preferably 1 to 4 carbon atoms), aryl or aryloxy (aryl preferably being phenyl or naphthyl). Furthermore, R and R', R" and also $R''_1$, R''' and $R'''_1$ may also be alkylidene bridges or fused-on aromatic rings. Particular preference is given to compounds which are substituted only by hydrogen atoms. Z and Z' are monovalent and divalent electronegative substituents, Z' for example representing —$SO_2$—, —CO—, —SO—, —($R_2$)—P(O)—, —C—(=$CF_2$)— or —C[=C($CN_2$)]— and Z being a monovalent electronegative group such as —$NO_2$, —NO, —$CF_3$ or —CN, or Z can be Z'-alkyl (alkyl = $C_1$-$C_8$, preferably $C_1$-$C_4$) or —Z'-aryl (aryl preferably being phenyl or naphthyl); $R_2$ represents alkyl ($C_1$-$C_8$, preferably $C_1$-$C_4$) or aryl (preferably phenyl or naphthyl). p is an integer such as 1, 2 or 3. Where p =1, R' and $R_1$, taken together, may also be a direct bond or an alkylidene bridge. Arylidene here preferably represents 1,2-phenylene or 1,2- or 2,3-naphthylene. X and X' are identical or different and are halogen atoms, particular preference being given to F and Cl. Examples of suitable dihalo compounds are: 2,4-dichloronitrobenzene, 2,4-difluoronitrobenzene, 2,4-difluorobenzophenone, 4,4'-dichlorodiphenyl sulfone, 4,4'-difluorodiphenylsulfone, 4,4'-dichlorobenzophenone, 4,4'-difluorobenzophenone, 4,4'-dichlorodiphenyl sulfoxide, 4,4'-difluorodiphenyl sulfoxide, 1,4-bis(4'-chlorobenzoyl)-benzene, 1,4-bis(4'-fluorobenzoyl)benzene, 1,3-bis(4'-fluorobenzoyl)benzene, 1,4'-bis(4'-chlorobenzenesulfonyl)benzene, 1,4-bis(4'-fluorobenzenesulfonyl)benzene, 4,4'-bis(4"-chlorobenzoyl)benzophenone, 4,4'-bis(4"-fluorobenzoyl)benzophenone, 2,5-bis(4'-fluorobenzoyl)naphthalene, 3,6-difluorofluorenone, 3,6-difluorodibenzothiophene-S,S-dioxide, bis-(4'-fluorophenyl)-phenylphosphineoxide, and 1,1-bis(4'-fluorophenyl)-2,2-dicyanoethylene.

Preference is given to the use of compounds of the formula (4)

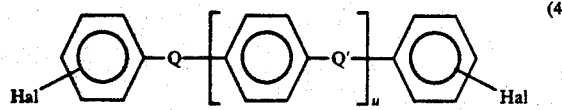

(4)

in which Hal are identical or different halogen atoms, preferably F or Cl, in the p- or o-position, Q and Q' are —CO— and/or —$SO_2$— groups and u is zero, 1 or 2.

Halophenols which can be used according to the invention are dinuclear or polynuclear phenols in which the halogen atom is not situated on the benzene ring which is substituted by the hydroxyl group and is activated by an electrophilic group in the ortho- or paraposition. These phenols can be represented by the general formula

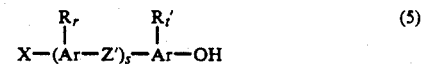

(5)

in which Ar is an arylene radical such as phenylene or naphthylene, r, s and t are integers such as 1, 2, 3 or 4; R and R' may be identical or different and are selected from the group comprising hydrogen, alkyl, alkoxy, each having 1-6 carbon atoms, preferably 1-4 carbon atoms, in the alkyl radical, aryl or aryloxy. Z' is as defined above. Examples of suitable halophenols are: 4-fluoro-4'-hydroxy-benzophenone, 4-chloro-4'-hydroxybenzophenone, 4-fluoro-4'-hydroxy-diphenyl sulfone, 4-chloro-4'-hydroxy-diphenyl sulfone, 1-(4'-hydroxybenzoyl)-4-(4"-chlorobenzoyl)benzene, and 1l-(4'-hydroxybenzoyl)-4-(4"-fluorobenzoyl)benzene.

The condensation reaction according to the invention is carried out either in bulk or in the presence of an inert solvent in which the polymer formed is soluble at the reaction temperature. Examples of suitable solvents are: diphenyl sulfone, cyclic aromatic sulfones such as dibenzothiophene-S,S-dioxide or, less preferably, benzophenone and cyclic aromatic ketones, for example fluorenone. Solvents of this type have been described, inter alia, in DE-A-2,803,873. In this case it is advantageous to suspend, at elevated temperature, sodium carbonate and/or sodium bicarbonate in a solution of a benzenoid dihalo compound in which the halogen atoms are activated by $SO_2$ or CO groups in o- or p-positions and then to meter in the benzenoid dihydroxy compound at elevated temperature.

The lower limit of the reaction temperature is set by the melting point of at least one of the components or of the solvent and the upper limit is set by the decomposition temperature of the condensation reactants or of the solvent (if used). Generally, the reaction temperature is within the range of 100° to 400° C., preferably 180° to 350° C., and depends on, among other factors, the reactivity of the condensation reactants and the type of solvent used (if any). It is preferable to operate by starting at a low reaction temperature and increasing the temperature gradually or stepwise if the viscosity of the reaction mixture increases.

If necessary, the condensation reaction can be carried out in the presence of a chain terminator (regulator). Examples of suitable regulators of this type are methyl chloride, t-butyl chloride, dimethyl sulfate, 4-chlorodiphenyl sulfone and 4-fluorobenzophenone.

The polymers which can be obtained according to the invention are suitable owing to their high heat resistance, their hydrolysis resistance and their other properties for, inter alia, coverings of electric cables, coatings for wires and monofilaments and for moldings in electrical equipment.

In the examples which follow, the inherent viscosity of the resulting polymers was determined in a solution of 0.5 g of the polymer in 100 ml of a suitable solvent, for example sulfuric acid for partly crystalline materials and N-methylpyrrolidone for amorphous materials. The inherent viscosity is defined as $$\eta_{inh} = \frac{\ln \eta_{rel}}{c} \text{ where } \eta_{rel} = \frac{t}{t_o}$$

t : flow time of the solution
$t_o$ : flow time of the solvent
c : concentration of the polymer in g/ml

EXAMPLES

1) A 1 liter four-necked flask fitted with an anchor stirrer having a good wall-sweeping action is charged under a protective atmosphere of argon with 300 g of diphenyl sulfone (= DPS) and 64.4 g of 1,4-bis-(4'-fluorobenzoyl)benzene (= BFB), the contents are melted and heated to 300° C. To the well-stirred DPS solution was then added uniformly within a period of 1 hour, a pulverulent mixture of 21.6 g of hydroquinone and 25.5 g of sodium carbonate. Before being used for the polycondensation, the sodium carbonate was ground and thoroughly dried. The particle size distribution analysis revealed a proportion of 50% smaller than 5.7 μm and a proportion of 90% smaller than 11 μm in particle size (D (50%) =5.7 μm, D (90%) 11 μm). The rapid course of the condensation can be monitored not only by quantitatively measuring the $CO_2$ liberated but by thin-layer chromatography of the remaining BFB. These methods show that 30 minutes after adding the hydroquinone/sodium carbonate mixture, the reaction had reached a steady state, all of the BFB having been consumed, and in this steady state a relatively low molecular weight polyether ketone was present. Then, while monitoring the viscosity of the reaction solution, further small portions of hydroquinone were added at 15 minute intervals. Three 0.11 g portions and one 0.055 g portion of hydroquinone were added so that the total amount of hydroquinone in the batch was 21.95 g corresponding to 99.75% of the stoichiometric amount. The overall reaction time including main and final condensations was 2 ½ hours.

The hot, viscous melt was cast into thin sheets which, after cooling and solidifying, were ground to give a coarse powder having a particle size of 2 mm, and this powder was extracted exhaustively in the normal manner using acetone and water. Drying gave 74 g (94% of theory) of polycondensate having the repeating unit

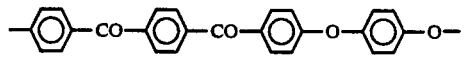

, in the form of a white powder.

This powder dissolved completely in sulfuric acid to give a reddish-orange particle-free solution. A solution which contained 0.5 g of polycondensate in 100 ml of conc. $H_2SO_4$ had an inherent solution viscosity of 174 ml/g.

2) (Variant of Example 1)

The apparatus described in Example 1 was used to mix 300 g of diphenyl sulfone and 64.4 g of BFB, and the mixture was melted and heated to 300° C. Then, at this temperature, 24.4 g of finely divided sodium carbonate were uniformly dispersed in the reaction solution with vigorous stirring. The sodium carbonate had a particle size distribution corresponding to D (50%) =12.7 μm and D (90%) =33 μm. After the sodium carbonate had been suspended, 21.78 g of hydroquinone were added at a constant temperature of 300° C. in the course of 40 minutes and the batch was stirred for 30 minutes. Then four 0.110 g portions of hydroquinone were added at intervals of 15 minutes. The fourth portion brought about a steep increase in the viscosity of the reaction solution. Working up the reaction solution by extraction with acetone and water and then drying gave 75 g (95.7% of theory) of the polycondensate, this having a viscosity of $\eta_{inh}$ =133 ml/g, measured in a 0.5% strength solution in conc. $H_2SO_4$.

3) (Comparison 1)

Example 2 was repeated but the 100–355 μm particle size screen fraction of a conventional calcined sodium carbonate was used. This gave a significantly reduced reaction rate. Even 120 minutes after adding the main amount of hydroquinone (99 mol %), water and $CO_2$ were still being slowly evolved. After 240 minutes, the further reaction had substantially subsided and 4 portions of hydroquinone, each of 0.110 g, were added, the interval between the individual additions being extended to 30 minutes. Despite the extended reaction time, no increase in the viscosity of the solution could be detected. Working up of the reaction solution gave a polycondensate and although this dissolved in $H_2SO_4$ without residue, the solution viscosity obtained was only $\eta_{inh}$ =22.3 ml/g.

4) Polycondensate having the repeating unit

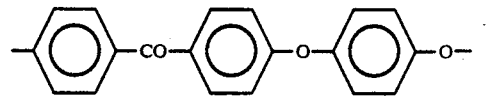

A four-necked flask was charged with 300 g of diphenyl sulfone and 65.4 g of 4,4'-difluorobenzophenone, the contents were melted and heated to 280° C. The base used was ground sodium carbonate according to Example 1. 38.2 g of this base, mixed with 32.7 g of hydroquinone, were introduced into the reaction solution in the course of 50 minutes. Then the batch was allowed to react for a further 1 hour at an increased temperature of 300° C., this giving an increase in viscosity. The subsequent addition over a period of 15 minutes of 0.110 g of hydroquinone gave a further increase in the viscosity of the reaction solution. The polycondensate which had been formed was isolated and purified, giving 83 g (96% of theory) of a white powder, which dissolves in $H_2SO_4$ to give a clear orange-red solution. The inherent viscosity of the 0.5% strength solution was $\eta_{inh}$ =131 ml/g.

5) Polycondensate having the repeating unit

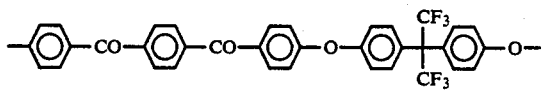

300 g of diphenyl sulfone and 64.4 g of BFB were melted and heated to 280° C. In the course of 50 minutes, a mixture of 65.86 g of 2,2-bis(4'-hydroxyphenyl)-1,1,1,3,3,3-hexafluoropropane (=6F-bisphenol A) and 25.4 g of ground sodium carbonate according to Example 2 was added. Directly after the metering-in had ceased, the viscosity of the reaction mixture began to increase. The addition of 0.34 g of 6F-bisphenol A gave, within 20 minutes, a further pronounced increase in viscosity. The reaction product was cooled to about 150° C. and diluted with 1.5 l of dimethylformamide (DMF). The resulting solution of the polycondensate was filtered and the salt-free solution was then introduced into 6 l of methanol to precipitate the polycondensate. The precipitated product was collected on a filter, washed with methanol and dried. The yield was 108 g (87.4% of theory). A 0.5% strength solution of the polycondensate in DMF had an inherent viscosity of 83 ml/g. Concentrated solutions in DMF or N-methylpyrrolidone (NMP) were cast into transparent films which had only a slight yellow color.

6) Polyether ketone having the repeating unit

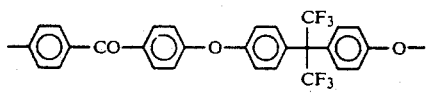

To a solution of 43.6 g of 4,4'-difluorobenzophenone in 300 g of DPS heated to 300° C. was introduced in the course of 55 minutes a mixture of 66.53 g of 6F-bisphenol A and 25.44 g of sodium carbonate. The sodium carbonate had been ground and had the particle size distribution given in Example 2. Directly after the introduction of the above mixture had ceased, the viscosity began to increase and within 20 minutes was so high that the reaction solution could no longer be uniformly stirred. The reaction solution was cooled, diluted with DMF and worked up as described in Example 5.

Yield: 99.3 g (96.3% of theory). A 0.5% strength solution of the polycondensate in DMF had an inherent viscosity of $\eta_{inh}$ = 85 ml/g.

Polycondensate having the repeating unit

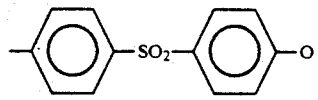

A 2 liter four-necked flask was first charged with 400 g of diphenyl sulfone and 229.6 g of 4,4'-dichlorodiphenyl sulfone, the contents were melted and heated to 300° C. In this melt were then uniformly suspended 93.28 g of sodium carbonate. The Na$_2$CO$_3$ had been finely ground and had a particle size distribution which was defined by D (50%) = 9.9 μm and D (90%) 40.1 μm. Into this reaction mixture were metered in, in the course of 75 minutes, 200 g of 4,4'-dihydroxydiphenyl sulfone and the mixture was allowed to react further for a period of one hour during which the viscosity of the solution slowly increased. Then 0.5 g of 4,4'-dihydroxydiphenyl sulfone was added, giving a pronounced increase in viscosity in the course of 15 minutes. A certain stirrer torque having been reached, the condensation was terminated by rapid cooling to 250° C. and at this temperature 25 g of chloromethane was passed through the batch in the course of one hour to block the terminal groups. After further cooling to 150° C., the reaction mixture was dissolved in 2.0 l of DMF and filtered through a suction filter to remove the salts. The clear, light yellow colored solution was introduced, with stirring, into a precipitation bath containing 10 l of methanol to precipitate the polyether sulfone. The precipitated solid was washed with methanol and dried. A 0.5% strength solution in DMF had a viscosity of $\eta_{inh}$ = 52 ml/g.

Yield 346 g (93.2% of theory).

8) Polycondensate having the repeating unit

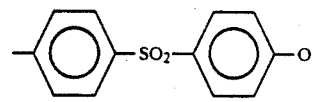

A 0.5 liter four-necked flask was used to mix 150 g of diphenyl sulfone and 57.4 g of 4,4'-dichlorodiphenyl sulfone, the mixture was melted and heated to 300° C. Then, in the course of 65 minutes, a mixture of 49.5 g of 4,4'-dihydroxydiphenyl sulfone and 23.32 g of sodium carbonate was introduced. The sodium carbonate had been ground and had the particle size distribution described in Example 7 (D (50%) = 9.9 μm). On subsequent reaction for one hour, the viscosity of the solution increased only slowly. Then, 0.250 g of 4,4'-dihydroxydiphenyl sulfone was added, followed 20 minutes later by a further 0.125 g portion. This gave initially a small decrease but subsequently a pronounced increase in the viscosity of the reaction solution. When no further increase in viscosity could be detected, the polycondensation was terminated by rapid cooling to 250° C. and at this temperature 10 g of chloromethane were passed through the batch for 30 minutes. The viscous reaction mixture was poured into cold water, the resulting strands were ground and then extracted a plurality of times by boiling with methanol and water.

Yield: 85.5 g (92.1% of theory). A 0.5% strength DMF solution had a viscosity of $\eta_{inh}$ = 51 ml/g.

9) (Comparison 2)

Example 8 was repeated but, instead of ground sodium carbonate, the 100–355 μm particle size screen fraction of a calcined Na$_2$CO$_3$ was used.

After introducing 99% of the stoichiometrically required amount of 4,4'-dihydroxydiphenyl sulfone together with the sodium carbonate, subsequent reaction for one hour gave no detectable increase in the viscosity of the reaction solution. Then five 0.250 g portions of dihydroxydiphenyl sulfone were added in succession at 20 minute intervals. However, in contrast to Example 8, this did not give any significant increase in the solution viscosity. After a total of 3 hours of subsequent reaction time, the batch was cooled to 250° C., 14 g of chloromethane were passed through and the reaction batch was worked up as usual by extraction with methanol and water. This gave 81.7 g (88 % of theory) of a polycondensate, a 0.5% strength DMF solution of which had an inherent viscosity of $\eta_{inh}$ = 16.5 ml/g.

We claim:

1. A process for the preparation of an aromatic polyether by condensation of the reactants in the presence of carbonates of metals from Group I of the Periodic Table as condensation auxiliaries, which comprises using metal carbonates in the form of very finely ground salts as condensation auxiliaries.

2. The process as claimed in claim 1, wherein sodium carbonate or sodium bicarbonate or mixtures thereof are used and the sodium carbonate or sodium bicarbonate has a proportion of 90% by weight of particle sizes of less than or equal to 50 μm (D (90%) ≦ 50 μm).

3. The process as claimed in claim 1, wherein the carbonate or bicarbonate is used in an amount which corresponds to 1 to 1.2 atoms of Na per phenol group.

4. The process as claimed in claim 1, wherein the condensation reaction is carried out in an aromatic sulfone.

5. The process as claimed in claim 4, wherein diphenyl sulfone is used.

6. The process as claimed in claim 1, wherein a benzenoid dihalo compound of the formula

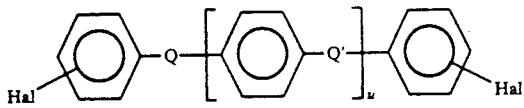     (4)

is used in which Hal are identical or different halogen atoms in the p- or o-position, Q and Q' are —CO— and/or —SO$_2$— groups and u is zero, 1 or 2.

7. The process as claimed in claim 6, wherein the benzenoid dihydroxy compound is a phenol of the formula

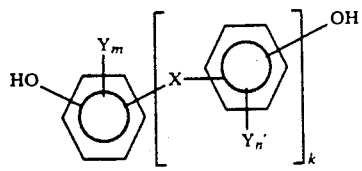     (1)

in which X is a direct bond, —O—, —S—, —SO$_2$—, —CO—, —CH$_2$—, —C(CH$_3$)$_2$—, or —C(CF$_3$)$_2$—, m and n are zero and k is zero or 1.

8. The process as claimed in claim 1, wherein sodium carbonate and/or sodium bicarbonate is suspended at a temperature of from 100° to 400° C. in a solution of a benzenoid dihalo compound in which the halogen atoms are activated by SO$_2$ or CO groups o- or p-positions and then the benzenoid dihydroxy compound is metered in at a temperature of from 100° to 400° C.

9. The process as claimed in claim 8, wherein the dihalo compound used is

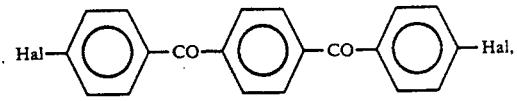

in which Hal is fluorine or chlorine, and the dihydroxy compound used is hydroquinone or 2,2-bis(4'-hydroxyphenyl)propane.

10. The process as claimed in claim 1, wherein polyethers are obtained whose inherent viscosity is from 50 to 500 ml/g (measured in a solution of 0.5 g of the polymer in 100 ml of solvent).

11. The process as claimed in claim 10, wherein the inherent viscosity is 75 to 300 ml/g.

12. The process as claimed in claim 1, wherein the reaction is carried out in the presence of a chain terminator.

13. The process as claimed in claim 12, wherein the regulator is methyl chloride, t-butyl chloride, dimethyl sulfate, 4-chlorodiphenyl sulfone or 4-fluorobenzophenone.

14. The process as claimed in claim 1, wherein the condensation reaction is carried out further in the presence of an inert solvent in which the polymer formed is soluble at the reaction temperature.

15. A process for the preparation of an aromatic polyether by condensation of the reactants in the presence of carbonates of metals from Group I of the Periodic Table as condensation auxiliaries, which comprises using sodium carbonate or dosium bicarbonate or mixtures thereof, wherein the sodium carbonate or sodium bicarbonate has a proportion of 90% by weight of particle sizes of less than or equal to 50 μm (D(90%) ≦50 μm) as condensation auxiliaries.

16. The process as claimed in claim 15, wherein the condensation reaction is carried out further in the presence of an inert solvent in which the polymer formed is soluble at the reaction temperature.

17. The process as claimed in claim 1, wherein the metal carbonate has a proportion of 90% by weight of particle sizes of less than or equal to 30 μm (D(90%) ≦30 μm).

* * * * *

UNITED STATES PATENT AND TRADEMARK OFFICE
CERTIFICATE OF CORRECTION

PATENT NO. : 5,194,561
DATED : March 16, 1993
INVENTOR(S) : Fischer et al.

It is certified that error appears in the above-indentified patent and that said Letters Patent is hereby corrected as shown below:

Claim 8, column 11, line 40, please add "in" after "groups";

Claim 15, column 12, line 31, please replace "dosium" with "sodium".

Signed and Sealed this

Eighth Day of March, 1994

Attest:

BRUCE LEHMAN

Attesting Officer  Commissioner of Patents and Trademarks